UNITED STATES PATENT OFFICE.

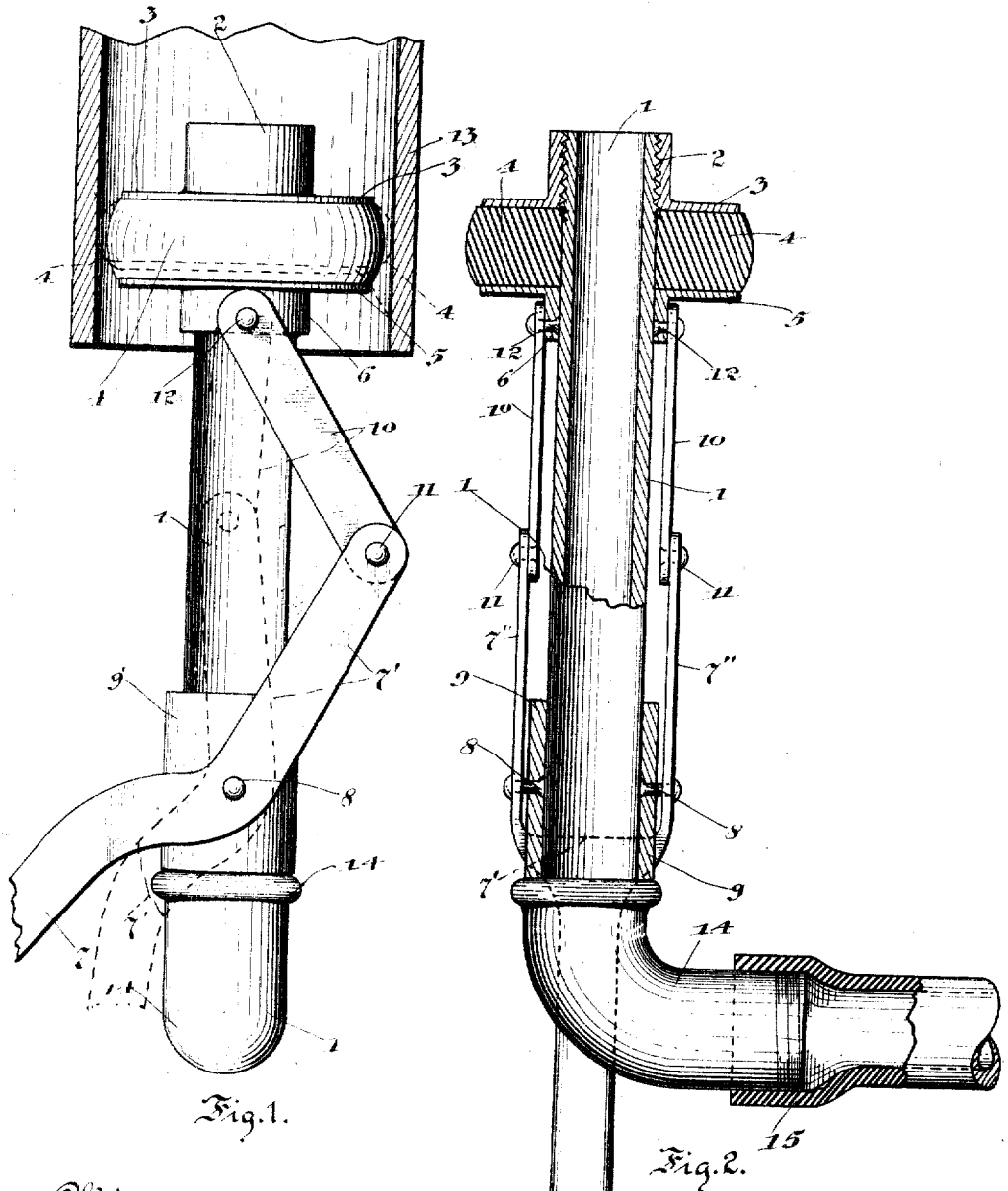

PAUL J. RICH, OF CHICAGO, ILLINOIS.

TESTING-PLUG FOR SOIL-PIPES.

995,987.

Specification of Letters Patent. Patented June 20, 1911.

Application filed December 27, 1910. Serial No. 599,518.

*To all whom it may concern:*

Be it known that I, PAUL J. RICH, a citizen of the United States, and a resident of the city of Chicago, county of Cook, and State of Illinois, have invented certain new and useful Improvements in Testing-Plugs for Soil-Pipes, of which the following is a specification.

My invention relates to improvements in testing devices for determining leaks in soil-pipes or other pipes used in building constructions, and has for its object the production of a device of this character which shall be simple of construction and efficient in operation.

My invention consists in the novel construction and arrangements of parts as will be hereinafter fully described and more particularly pointed out in the appended claims.

My invention will be best understood by reference to the accompanying drawings, and in which—

Figure 1 is a side elevation of my improved testing device, and Fig. 2 is a central longitudinal section thereof.

The preferred form of my invention as illustrated in the accompanying drawings, comprises a cylindrical metallic pipe 1 having a threaded end 2 on which is screwed a radial flange 3, the threaded connection thus formed rendering said flange longitudinally adjustable. Seated on the flange 3 or arranged to abut one side thereof is an annular rubber radial expansion ring 4, the periphery thereof being rounded in cross section, as illustrated in Fig. 2. The ring 4 is soft and pliable, hence readily compressible, so that the periphery thereof may be forced into contact with the interior wall of a pipe which is larger in diameter than the normal diameter of said ring. In order to compress the ring 4, a radial slidable flange 5 is mounted on the pipe 1 so as to contact with one side of said ring, the hub 6 of said flange depending therefrom as illustrated in Fig. 2.

In order to move the flange 5 along the pipe 1 for compressing the ring 4, a lever 7 having a bifurcated portion 7' forming arms 7'' is pivoted to move as indicated in Fig. 1. The pins 8 by means of which the arms 7'' are pivoted, project from a sleeve 9 at diametrically opposite points thereof, said sleeve being stationary and mounted on the pipe 1. The free ends of the arms 7'' are pivotally connected with the hub 6 of the flange 5 by means of links 10, pins or rivets 11 and 12 forming the pivotal connections.

The arrangement of the links 10 and the lever 7 is such that when the latter is moved or swung into the dotted line position as shown in Fig. 1 for compressing the expansion ring 4, that the bifurcated portion 7' of the lever 7 will serve as a stop for the latter when said links and the arms 7'' are in substantial alinement as clearly shown in Fig. 1. Thus the ring 4 will remain locked in expanded condition in the soil-pipe 13 until leaks in said soil-pipe have been detected. As aforesaid, the flange 3 is adjustably mounted on the pipe 1, which construction obviously permits the necessary adjustment of the operating parts when rings 4 of varying thicknesses are used. Provided at one end of the pipe 1 is an elbow 14 which supports the sleeve 9, a flexible hose 15 being connected with said elbow for the admission of fluid into the pipe 1, as will be understood by those skilled in the art.

In the operation of the device, a section of the soil-pipe 13 is first removed, then the testing device is inserted into the remaining pipe so that the expansion member 4 shall be disposed at right angles to the axis of the soil-pipe. The lever 7 is then thrown to the dotted line position, when the expansion member will change its form as indicated by dotted lines, thus forming an efficient temporary closure for said soil-pipe. After the testing operation is completed a single throw of the lever 7 in the opposite direction will disconnect the testing device from the soil-pipe when the fluid therein will escape. It is understood that water, smoke or other fluid may be forced into the soil-pipe from the hose 15 as may be required during the testing operation.

A testing device of the construction set forth is simple of construction and efficient in operation.

While I have illustrated and described the preferred construction for carrying my invention into effect this is capable of variation without departing from the spirit of the invention. I, therefore, do not wish to be limited to the exact details of construction set forth but desire to avail myself of such variations and modifications as come within the scope of the appended claims.

Having described my invention what I claim as new and desire to secure by Letters Patent is:—

1. A testing device comprising a pipe, an elbow provided on one end of said pipe, a flexible hose connected to said elbow, a radial flange provided at the other end of said pipe, an annular expansion ring seated on said flange, and means for forcing said expansion ring against the seat thereof comprising a flange abutting said ring and slidably mounted on said pipe, a stationary sleeve surrounding said pipe and supported by said elbow, a lever pivoted to said sleeve and a link connection between said lever and slidable flange, substantially as described.

2. In a testing device, the combination with a soil-pipe, of a fluid pipe inserted in said soil-pipe in axial alinement therewith, a radial flange adjustably fixed to one end of said fluid pipe, an annular rubber radial expansion ring surrounding said fluid pipe and adapted to close said soil-pipe, a radial slidable flange mounted on said fluid pipe and adapted to compress said ring against said first-named radial flange, an elbow provided on the lower end of said fluid pipe, a flexible hose connected with said elbow, a stationary sleeve mounted on said fluid pipe and supported by said elbow, a lever having a pair of arms pivoted to said sleeve at diametrically opposite points, and a pair of links connecting the free ends of said arms with said slidable flange, substantially as described.

3. A testing device comprising a pipe and a compressible annular member mounted thereon, a flange on said pipe serving as a seat for one side of said member, a slidable flange mounted on said pipe and adapted to contact with the other side of said member for compressing the same, a lever bifurcated to form arms which are pivotally mounted on said pipe, the bifurcated portion of said lever serving as a stop for the swing thereof in one direction, and link connections between said arms and said slidable flange, the disposition of said links being in substantial alinement with said pipe when said lever is stopped in its movement by said bifurcated portion, substantially as described.

In testimony whereof I have signed my name to this specification in the presence of two subscribing witnesses.

PAUL J. RICH.

Witnesses:
HELEN F. LILLIS,
JOSHUA R. H. POTTS.